US012316383B2

(12) United States Patent
Kawahara et al.

(10) Patent No.: US 12,316,383 B2
(45) Date of Patent: May 27, 2025

(54) WAVELENGTH CROSS CONNECT DEVICE, MULTIBAND TRANSMISSION SYSTEM, AND MULTIBAND TRANSMISSION METHOD

(71) Applicant: Nippon Telegraph and Telephone Corporation, Tokyo (JP)

(72) Inventors: Hiroki Kawahara, Musashino (JP); Takeshi Seki, Musashino (JP); Sachio Suda, Musashino (JP); Kohei Saito, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 124 days.

(21) Appl. No.: 18/014,673

(22) PCT Filed: Jul. 6, 2020

(86) PCT No.: PCT/JP2020/026498
§ 371 (c)(1),
(2) Date: Jan. 5, 2023

(87) PCT Pub. No.: WO2022/009292
PCT Pub. Date: Jan. 13, 2022

(65) Prior Publication Data
US 2023/0275668 A1 Aug. 31, 2023

(51) Int. Cl.
*H04Q 11/00* (2006.01)
*H04B 10/293* (2013.01)
*H04J 14/02* (2006.01)

(52) U.S. Cl.
CPC ........ *H04B 10/293* (2013.01); *H04J 14/0212* (2013.01); *H04Q 11/0005* (2013.01)

(58) Field of Classification Search
CPC .................................................. H04J 14/0212
See application file for complete search history.

(56) References Cited

U.S. PATENT DOCUMENTS

| | | | |
|---|---|---|---|
| 2004/0165818 A1 | 8/2004 | Oikawa | |
| 2015/0256908 A1* | 9/2015 | Zhu | H04J 14/0205 398/85 |
| 2020/0274633 A1* | 8/2020 | Yuki | H04J 14/0213 |

FOREIGN PATENT DOCUMENTS

| | | |
|---|---|---|
| JP | 2000115133 | 4/2000 |
| JP | 2004254157 | 9/2004 |
| JP | 2020137042 | 8/2020 |

OTHER PUBLICATIONS

Napoli et al., "Perspectives of Multi-band Optical Communication Systems," The 23rd OptoElectronics and Communications Conference (OECC 2018) Technical Digest, Jul. 2, 2018, 2 pages.

* cited by examiner

*Primary Examiner* — Shi K Li
(74) *Attorney, Agent, or Firm* — Fish & Richardson P.C.

(57) ABSTRACT

A wavelength cross-connect device is formed by connecting a plurality of wavelength cross-connect devices in a ring-like form with WDM networks for each band of a plurality of bands on the input/output sides of the wavelength cross-connect devices, and includes a link wavelength allocation control unit. The link wavelength allocation control unit performs control to set different optical paths through which optical signals of the same wavelength are transmitted in the same zone between wavelength cross-connect devices, in the WDM networks of different bands in the same zone.

8 Claims, 7 Drawing Sheets

MULTIBAND TRANSMISSION METHOD

WAVELENGTH CROSS CONNECT DEVICE, MULTIBAND TRANSMISSION SYSTEM, AND MULTIBAND TRANSMISSION METHOD

CROSS-REFERENCE TO RELATED APPLICATIONS

This application is a National Stage application under 35 U.S.C. § 371 of International Application No. PCT/JP2020/026498, having an International Filing Date of Jul. 6, 2020, the disclosure of which is considered part of the disclosure of this application, and is incorporated by reference in its entirety into this application.

TECHNICAL FIELD

The present invention relates to a wavelength cross-connect device, a multiband transmission system, and a multiband transmission method to be used for multiband transmission in which multiple wavelength signal light obtained by multiplexing respective optical signals in different wavelength bands is transmitted through an optical fiber.

BACKGROUND ART

Figure 6:
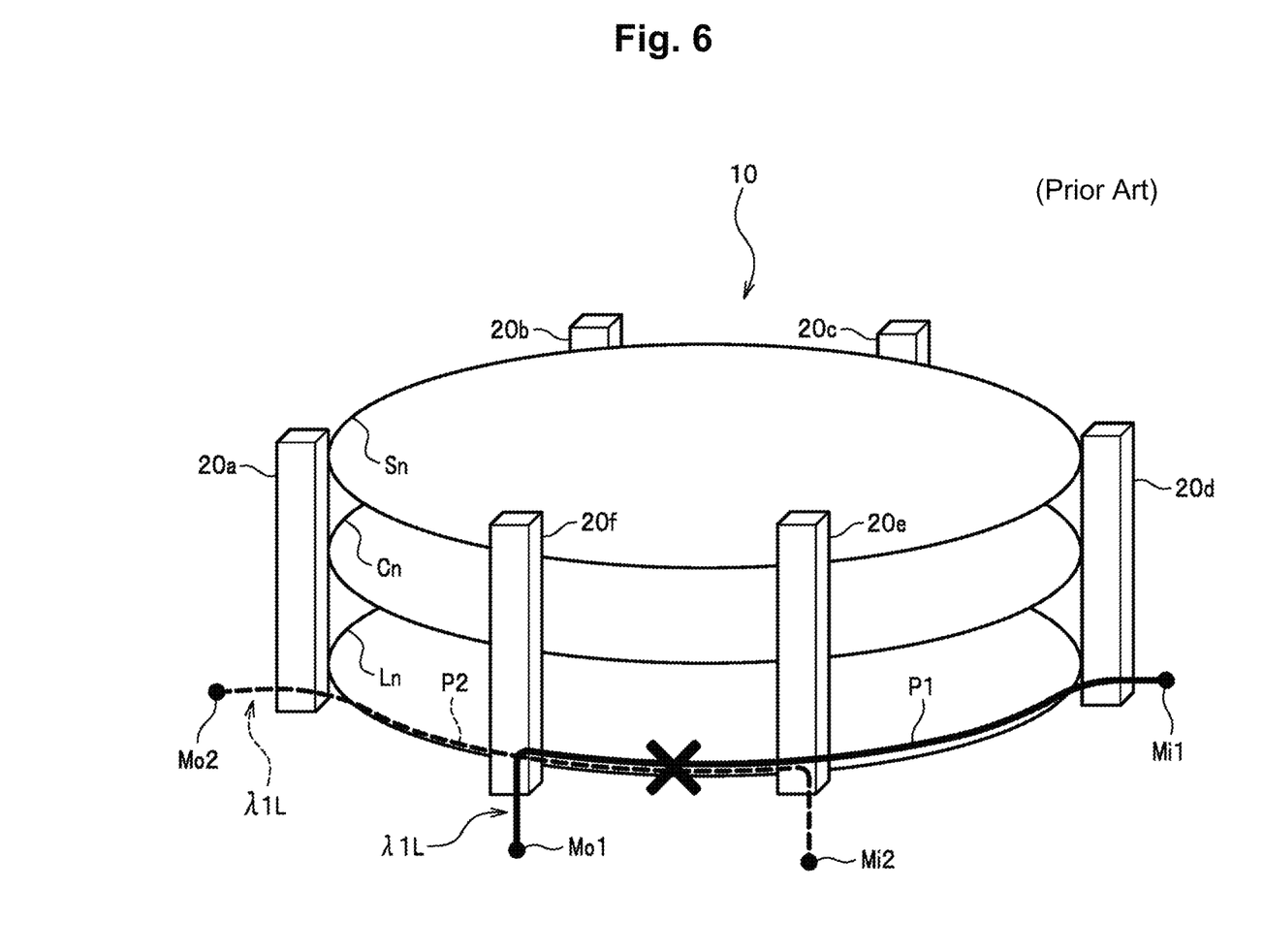
FIG. 6 is a diagram illustrating the configuration of a multiband transmission system using conventional wavelength cross-connect devices.

Wavelength division multiplexing (WDM) transmission for transmitting the above-mentioned multiple wavelength signal light through one optical fiber is known. FIG. 6 is a block diagram illustrating the configuration of a multiband transmission system (also referred to as the system) using conventional WDM.

A multiband transmission system 10 illustrated in FIG. 6 is formed by connecting a plurality of wavelength cross-connect devices 20a, 20b, 20c, 20d, 20e, and 20f separated from one another in a ring-like form with an S-band WDM network Sn, a C-band WDM network Cn, and an L-band WDM network Ln. The S-band WDM network Sn, the C-band WDM network Cn, and the L-band WDM network Ln are separated from one another. S-band, C-band, and L-band will be described later.

Figure 7:
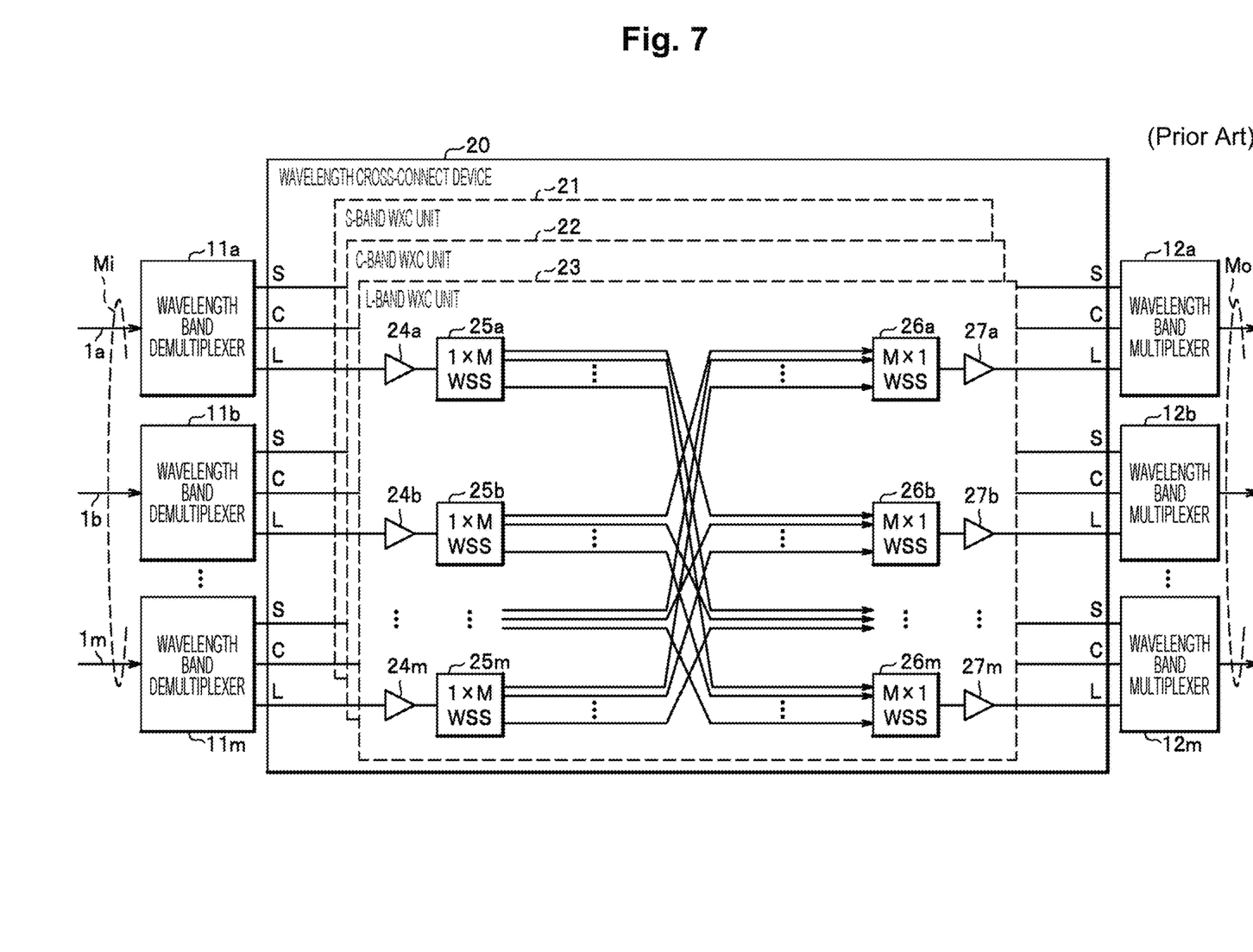
FIG. 7 is a block diagram illustrating the configuration of a conventional wavelength cross-connect device.

FIG. 7 illustrates the configuration of a wavelength cross-connect device 20 that is used in the conventional system 10. The wavelength cross-connect device 20 indicates the wavelength cross-connect devices 20a to 20f having the same configuration.

M wavelength band demultiplexers (also referred to as demultiplexers) 11a, 11b, . . . , and 11m connected to respective M paths denoted by reference sign Mi are connected to the input side of the wavelength cross-connect device 20, and M wavelength band multiplexers (also referred to as multiplexers) 12a, 12b, . . . , and 12m connected to respective M paths denoted by reference sign Mo are connected to the output side.

The wavelength cross-connect device 20 further includes an S-band wavelength cross-connect (WXC) unit 21, a C-band WXC unit 22, and an L-band WXC unit 23 connected by optical fibers between the demultiplexers 11a to 11m and the multiplexers 12a to 12m. Note that the S-band WXC unit 21, the C-band WXC unit 22, and the L-band WXC unit 23 are also referred to as the WXC units 21 to 23.

In the system 10 illustrated in FIG. 6, the S-band WXC units 21 of the respective wavelength cross-connect devices 20a to 20f are connected by the S-band WDM network Sn, the C-band WXC units 22 are connected by the C-band WDM network Cn, and the L-band WXC units 23 are connected by the L-band WDM network Ln.

Each of the wavelength cross-connect devices 20a to 20f indicated by quadrangular prisms in FIG. 6 also includes the demultiplexers 11a to 11m and the multiplexers 12a to 12m. The input-side paths Mi connected to the demultiplexers 11a to 11m and the output-side paths Mo connected to the multiplexers 12a to 12m are connected to the lower end side or the upper end side of the quadrangular prism.

As typically indicated by the L-band WXC unit 23, each of the WXC units 21 to 23 illustrated in FIG. 7 includes M optical amplifiers 24a, 24b, . . . , and 24m, and M WSSs 25a, 25b, . . . , and 25m on the input side. Each of the WSSs 25a to 25m has one input end and M output ends (1×M). Further, the L-band WXC unit 23 includes M WSSs 26a, 26b, . . . , and 26m having M input ends and one output end (M×1), and M optical amplifiers 27a, 27b, . . . , and 27m on the output side. The respective components of the optical amplifiers 24a to 24m, the WSSs 25a to 25m, the WSSs 26a to 26m, and the optical amplifiers 27a to 27m are connected by optical fibers or optical waveguides.

Although not illustrated in the drawing, the S-band WXC unit 21 and the WXC unit 22 also include optical amplifiers 24a to 24m, WSSs 25a to 25m, WSSs 26a to 26m, and optical amplifiers 27a to 27m, like the L-band WXC unit 23 described above.

Multiple wavelength signal light beams 1a, 1b, . . . , and 1m transmitted in multiple bands through the respective M paths on the input side are input to the demultiplexers 11a to 11m as follows. That is, the multiple wavelength signal light beam 1a is input to the demultiplexer 11a, the multiple wavelength signal light beam 1ba is input to the demultiplexer 11b, and the multiple wavelength signal light beam 1m is input to the demultiplexer 11m.

However, each of the multiple wavelength signal light beams 1a to 1m is obtained by multiplexing the respective optical signals in S-band, C-band, and L-band of the wavelength bands described later. The respective wavelength bands are S-band of 1460 nm to 1530 nm, C-band of 1530 nm to 1565 nm, and L-band of 1565 nm to 1625 nm, in ascending order of wavelength. The respective optical signals in S-band, C-band, and L-band are allocated to S-band, C-band, and L-band of the optical fibers as the paths at the time of transmission.

Note that, in FIG. 7, S-band, C-band, and L-band of the optical signals are indicated by "S", "C", and "L" on the transmission paths of the optical signals.

The demultiplexer 11a demultiplexer the multiple wavelength signal light beam 1a into the respective optical signals in S-band, C-band, and L-band, and outputs the optical signals to the optical amplifiers 24a of the respective WXC units 21 to 23. That is, the demultiplexer 11a outputs the demultiplexed S-band optical signal to the optical amplifier 24a of the S-band WXC unit 21, outputs the C-band optical signal to the optical amplifier 24a of the WXC unit 22, and outputs the L-band optical signal to the optical amplifier 24a of the L-band WXC unit 23.

Like the demultiplexer 11a described above, the other demultiplexers 11b to 11m demultiplex the multiple wavelength signal light beams 1b to 1m into the respective optical signals in S-band, C-band, and L-band, and outputs the optical signals to the optical amplifiers 24b to 24m of the respective WXC units 21 to 23.

The optical amplifiers 24a to 24m of the WXC units 21 to 23 amplify the respective optical signals in S-band, C-band, and L-band, and output the amplified optical signals to the WSSs 25a to 25m of the respective WXC units 21 to 23.

Each of the WSSs 25a to 25m has functions of selecting an optical signal of each wavelength band (each band), adjusting the attenuation amount, and the like. The M output ends of the respective WSSs 25a to 25m are connected to the M input ends of the WSSs 26a to 26m on the output side.

For example, the WSS 25a outputs the L-band optical signal from a first output end shown at the top to a second input end of the WSS 26b on the output side, outputs the L-band optical signal from a second output end to an input end of a WSS (not shown) on the output side, and outputs the L-band optical signal from a third output end to a first input end of the WSS 26m on the output side. In this manner, the L-band optical signal is output from each output end of one WSS 25a to input ends of different WSSs 26a to 26m.

Each of the WSSs 26a to 26m on the output side sequentially selects optical signals of a plurality of wavelength bands input from the M input ends, and outputs the optical signals from one output end to the optical amplifiers 27a to 27m.

The output ends of the respective optical amplifiers 27a to 27m are connected to the multiplexers 12a to 12m. With this arrangement, the optical amplifiers 27a to 27m amplify the respective optical signals in S-band, C-band, and L-band, and then output the amplified S-band, C-band, and L-band optical signals to the corresponding multiplexers 12a to 12m. After this output, the respective multiplexers 12a to 12m multiplex the respective S-band, C-band, and L-band optical signals amplified by the optical amplifiers 27a to 27m of the respective WXC units 21 to 23. The multiple wavelength signal light beams obtained by this multiplexing are transmitted in multiple bands to M paths Mo.

Non Patent Literature 1 discloses a conventional technology relating to such a wavelength cross-connect device 20.

CITATION LIST

Non Patent Literature

Non Patent Literature 1: A. Napoli et al., "Perspectives of Multi-band Optical Communication Systems," OECC2018, 5B3-1, July 2018.

SUMMARY OF INVENTION

Technical Problem

In the system 10 illustrated in FIG. 6 described above, the S-band WDM network Sn, the C-band WDM network Cn, and the L-band WDM network Ln that connect the S-band WXC units 21, the C-band WXC units 22, and the L-band WXC units 23 (FIG. 7) of the respective wavelength cross-connect devices 20a to 20f in each band are separated from one another and are independent of one another. Therefore, optical signals cannot be transmitted between the WDM networks Sn, Cn, and Ln in different bands. That is, the WXC units 21 to 23 in the same band perform communication via the L-band WDM network Ln, the C-band WDM network Cn, or the L-band WDM network Ln in the same band.

As illustrated in FIG. 6, an optical path P1 is set in the L-band WDM network Ln from the input-side path Mi1 to the output-side path Mo1 via the wavelength cross-connect devices 20d, 20e, and 20f, for example. An optical signal λ1L of a wavelength λ1 is transmitted to the optical path P1 in L-band. At this point of time, an optical path P2 is set in the L-band WDM network Ln from the input-side path Mi2 to the output-side path Mo2 via the wavelength cross-connect devices 20e, 20f, and 20a, and the same optical signal λ1L as above is transmitted to the optical path P2.

In this case, the optical signals λ1L of the same wavelength λ1 pass through the different optical paths P1 and P2, but these optical paths P1 and P2 are set in the same L-band WDM network Ln. For this reason, when the optical signals λ1L of the same wavelength λ1 pass through the same L-band WDM network Ln between the wavelength cross-connect devices 20e and 20f, for example, a wavelength collision might occur as indicated by a cross mark, and transmission might not be performed. Further, since the S-band, C-band, and L-band WXC units 21 to 23 are used in the wavelength cross-connect devices 20a to 20f, the device size and power consumption of the WXC unit might increase.

The present invention has been made in view of such circumstances, and aims to reduce the device size and the power consumption of the WXC unit of a wavelength cross-connect device, and transmit optical signals of the same wavelength from an input-side path to an output-side path through different optical paths without any wavelength collision in a multiband transmission system using the wavelength cross-connect device.

Solution to Problem

To solve the above problem, the present invention provides a wavelength cross-connect device that performs a relay process of amplifying, with an optical amplifier, optical signals in respective wavelength bands formed by demultiplexing multiple wavelength signal light into different wavelength bands for each path, changing paths with a wavelength selective switch (WSS), and outputting the optical signals to an output-side path, the multiple wavelength signal light being formed by multiplexing respective optical signals in different wavelength bands transmitted in multiple bands through an optical transmission line formed with one or a plurality of optical fibers, the WSS performing optical signal processing of outputting a plurality of combined inputs from one input end through one output end on the outside side after branching and outputting inputs from one input end through one output end on the input side. The wavelength cross-connect device includes: a wavelength cross-connect (WXC) unit that includes the optical amplifier and the WSS, and performs the relay process on an optical signal in a predetermined specific wavelength band among the different wavelength bands; an input-side conversion unit that is disposed on the input side of the WXC unit, and converts an optical signal in a wavelength band other than the specific wavelength band into an optical signal in the specific wavelength band; and an output-side conversion unit that is disposed on the output side of the WXC unit, and converts the optical signal in the specific wavelength band converted by the input-side conversion unit into the optical signal prior to conversion. An optical signal in the specific wavelength band that has been input directly from the input side is directly output after the relay process at the WXC unit.

Advantageous Effects of Invention

According to the present invention, it is possible to reduce the device size and the power consumption of the WXC unit of a wavelength cross-connect device, and transmit optical signals of the same wavelength from an input-side path to an output-side path through different optical paths without any wavelength collision in a multiband transmission system using the wavelength cross-connect device.

DESCRIPTION OF EMBODIMENTS

Embodiments of the present invention will be described below, with reference to the drawings. However, in all the drawings in this description, components having corresponding functions are denoted by the same reference numerals, and explanation thereof will not be unnecessarily repeated.

<Configuration of an Embodiment>

Figure 1:
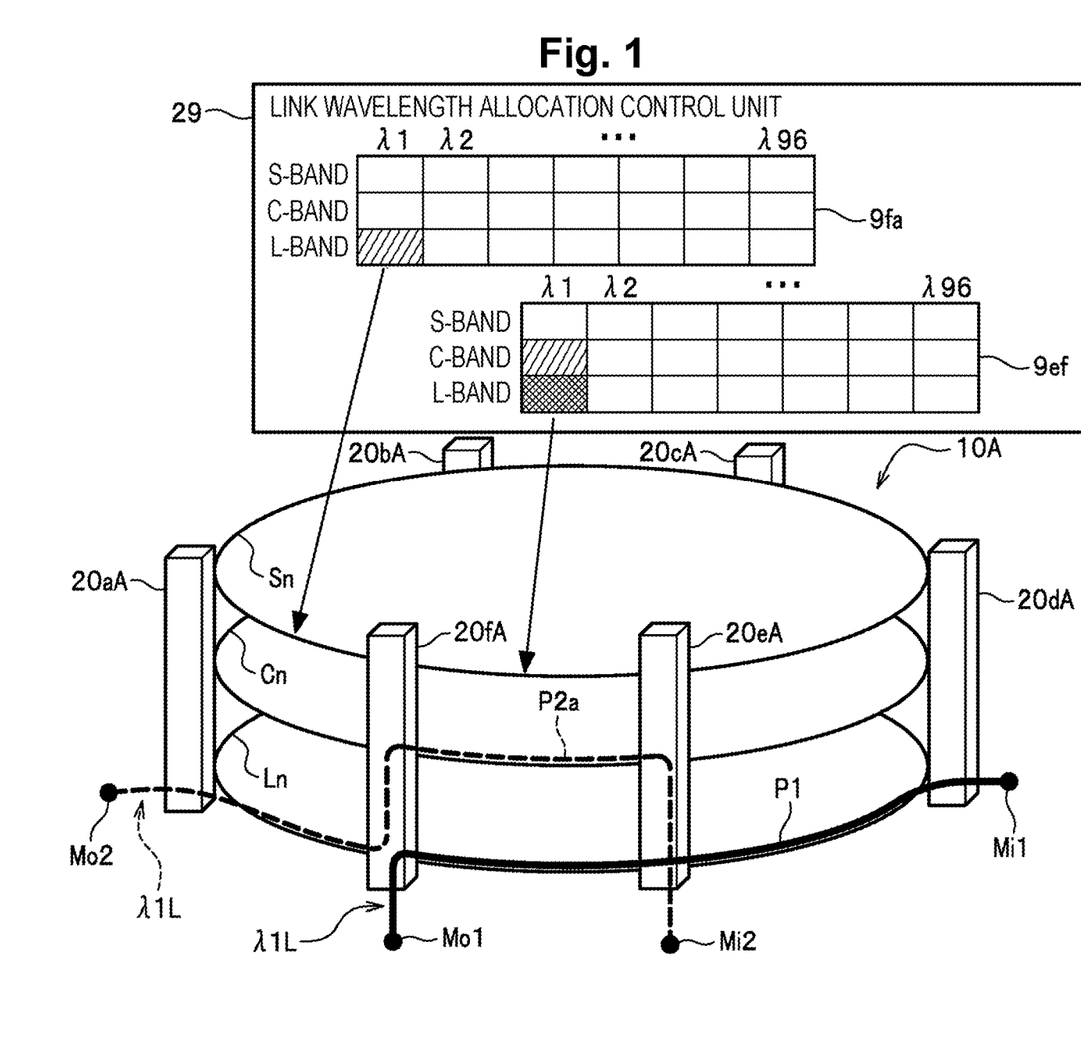
FIG. 1 is a diagram illustrating the configuration of a multiband transmission system using WDM according to an embodiment of the present invention.

FIG. 1 is a diagram illustrating the configuration of a multiband transmission system using WDM according to an embodiment of the present invention. A multiband transmission system (system) 10A illustrated in FIG. 1 differs from the conventional multiband transmission system (FIG. 6) in that the respective wavelength cross-connect devices 20aA, 20bA, 20cA, 20dA, 20eA, and 20fA can transmit optical signals through the WDM networks Sn, Cn, and Ln of different bands.

Figure 2:
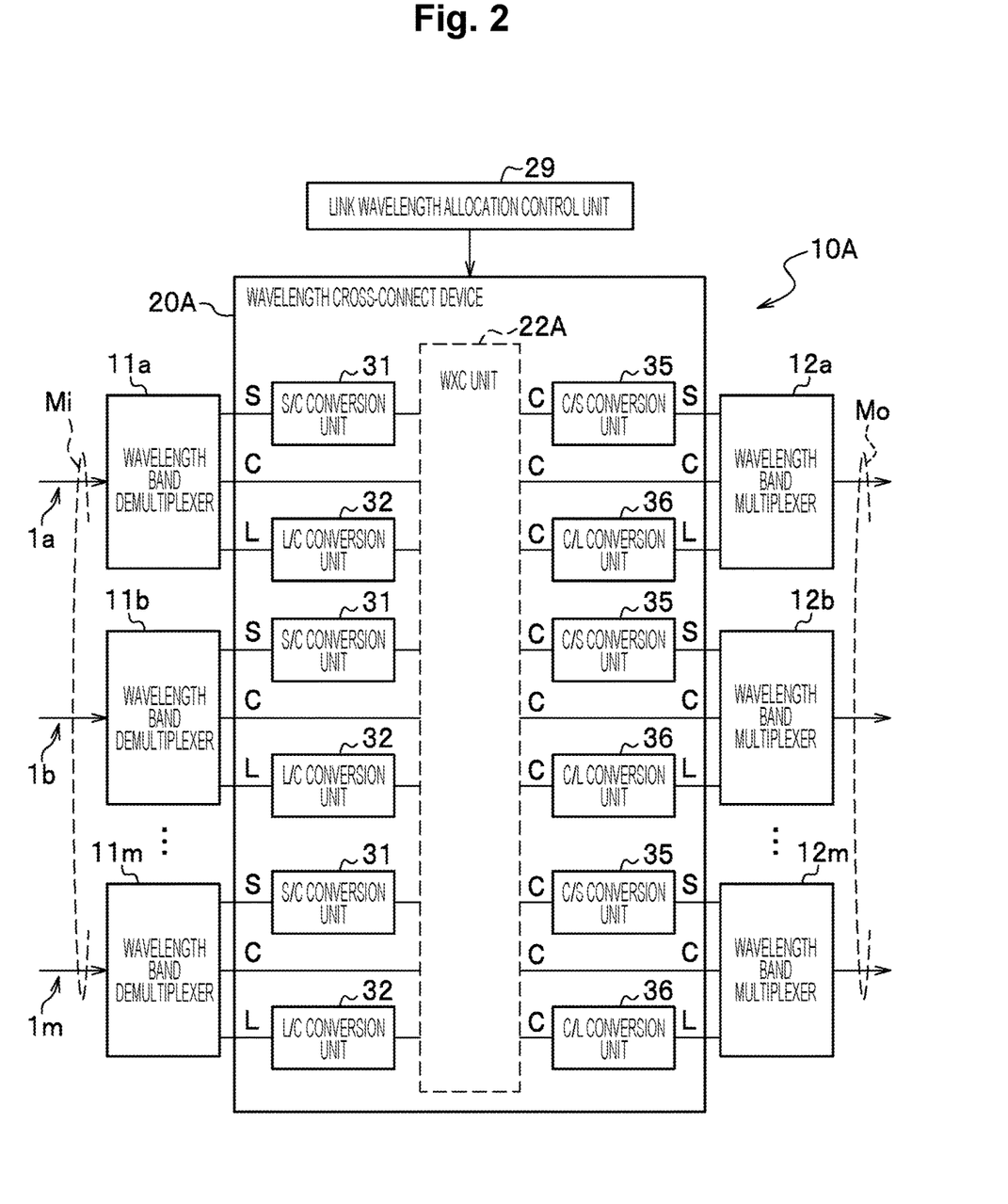
FIG. 2 is a block diagram illustrating the configuration of each wavelength cross-connect device of the multiband transmission system.

FIG. 2 illustrates the configuration of a wavelength cross-connect device 20A that is used in the system 10A of this embodiment. The wavelength cross-connect device 20A indicates the wavelength cross-connect devices 20aA to 20fA having the same configuration.

The wavelength cross-connect device 20A includes, between the demultiplexers 11a to 11m and the multiplexers 12a to 12m, S/C conversion units 31, L/C conversion units 32, and optical amplifiers 24a to 24m (not shown in FIG. 2) on the input side, one WXC unit 22A, and optical amplifiers 27a to 27m (not shown in FIG. 2), C/S conversion units 35, and C/L conversion units 36 on the output side. Further, a link wavelength allocation control unit 29 is connected to the wavelength cross-connect device 20A. However, as illustrated in FIG. 1, the link wavelength allocation control unit 29 is connected so as to collectively control all the wavelength cross-connect devices 20a to 20f of the system 10A. The link wavelength allocation control unit 29 may be designed as one device.

Figure 3:
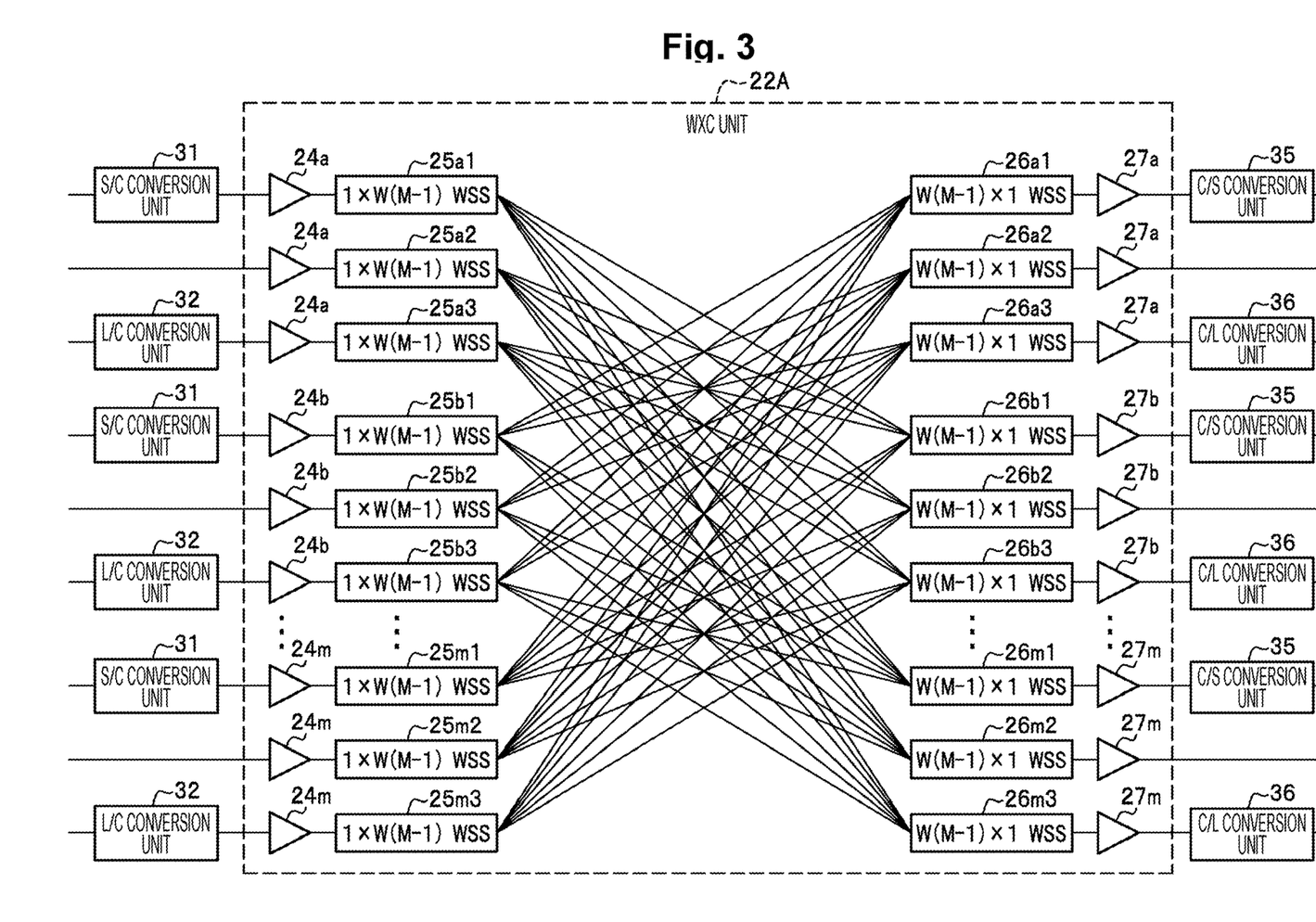
FIG. 3 is a block diagram illustrating the configuration of a WXC unit of a wavelength cross-connect device.

As illustrated in FIG. 3, the WXC unit 22A handles a C-band wavelength that is a specific wavelength band, for example. The WXC unit 22A includes m sets of optical amplifiers 24a, 24b, . . . , and 24m on the input side, and 1×W(M−1) WSSs 25a1 to 25a3, 25b1 to 25b3, . . . , and 25m1 to 25m3 (also referred to as the WSSs 25a1 to 25m3) connected to the respective optical amplifiers 24a to 24m, each one set of optical amplifiers being formed with three optical amplifiers.

On the output side of the WXC unit 22A, W(M−1)×1 WSSs 26a1 to 26a3, 26b1 to 26b3, . . . , and 26m1 to 26m3 (also referred to as the WSSs 26a1 to 26m3) as many as the WSSs 25a1 to 25m3 on the input side, and M sets of optical amplifiers 27a, 27b, . . . , and 27m are provided, each one set of optical amplifiers being formed with three optical amplifiers.

In "1×W(M−1)" in the above expression, "1" indicates that each of the WSSs 25a1 to 25m3 has one input end. "W(M−1)" represents the number of branches of the output ends of each of the WSSs 25a1 to 25m3. Further, in "W(M−1)×1", "W(M−1)" represents the number of branches on the input side of each of the WSSs 26a1 to 26m3. Here, "1" indicates that each of the WSSs 26a1 to 26m3 has one output end.

"W" in the above represents the number of wavelength bands, and the three wavelength bands of S-band, C-band, and L-band in this example. "M" represents the number of sets when the same numbers of WSSs 26a1 to 26m3 and WSSs 26a1 to 26m3 are grouped in the same path. For example, where the WSSs on the input side and the output side are three sets (hereinafter, a specific example number of sets will be three) of WSSs 25a1 to 25a3 in a first path, WSSs 25b1 to 25b3 in a second path, and WSSs 25m1 to 25m3 in a third path, M=3. In this case, in the WSS 25a1 on the input side, for example, W(M−1)=3(3−1)=6, and accordingly, the number of branches of the output ends of the WSS 25a1 is six. In the WSS 26a1 on the output side, for example, W(M−1)=3(3−1)=6, and accordingly, the number of branches of the input ends of the WSS 26a1 is six.

In view of this, the output ends of the WSSs 25a1 in the first set from the top are connected to a total of six output ends of the WSSs 26b1A to 26b3 in a path other than the current path, which is the path of the second set other than the path of the first set, and the WSSs 26m1A to 26m3 in the mth set (the third set, for example). In other words, the WSS 25a1 on the input side and the WSS 26b1 on the output side, for example, perform optical signal processing to branch and output a plurality of inputs from one input end through one output end on the input side, and then output a plurality of combined inputs from one input end through one output end on the output side. The other WSSs have the same connection form, and therefore, explanation thereof is not made herein.

Next, as illustrated in FIG. 1, the link wavelength allocation control unit 29 includes wavelength allocation tables (wavelength allocation tables 9ef and 9fa as an example), allocates an optical path (link) to each of the S-band, C-band, and L-band WDM networks Sn to Ln that connect the wavelength cross-connect devices 20a to 20f, and performs setting for allocating predetermined wavelengths λ1 to λ96 in the wavelength allocation tables.

In the wavelength allocation table 9ef, setting is performed to allocate the wavelengths λ1 to λ96 to an optical path of S-band, C-band, and L-band between the wavelength cross-connect devices 20eA and 20fA. In the wavelength allocation table 9fa, setting is performed to allocate the wavelengths λ1 to λ96 to an optical path of S-band, C-band, and L-band between the wavelength cross-connect devices 20fA and 20aA.

In the example illustrated in FIG. 1, the link wavelength allocation control unit 29 performs setting to allocate the wavelength λ1 to the L-band WDM network Ln and the C-band WDM network Cn between the wavelength cross-connect devices 20eA and 20fA in the wavelength allocation table 9ef. Also, in the wavelength allocation table 9fa, setting is performed to allocate the wavelength λ1 to the L-band WDM network Ln between the wavelength cross-connect devices 20fA and 20aA.

By performing this setting, the link wavelength allocation control unit 29 can set an optical path P1 (solid line) through which an optical signal λ1L of the wavelength λ1 can be transmitted in L-band in the L-band WDM network Ln from the path Mi1 on the input side toward the path Mo1 on the output side via the wavelength cross-connect devices 20dA, 20eA, and 20fA, for example.

At the same time as this, the link wavelength allocation control unit 29 can set an optical path P2a (dashed line) through which the same optical signal λ1L as above can be transmitted from the path Mi2 on the input side toward the path Mo2 on the output side via the wavelength cross-connect devices 20eA, 20fA, and 20aA, in the C-band WDM network Cn between the wavelength cross-connect devices 20eA and 20fA, and in the L-band WDM network Ln between the wavelength cross-connect devices 20fA and 20aA.

That is, in a case where the different optical paths P1 and P2a through which optical signals λ1L of the same wavelength λ1 are transmitted are set in the same zone (between the wavelength cross-connect devices 20eA and 20fA, for example), the link wavelength allocation control unit 29 sets the optical paths P1 and P2a in WDM networks of different bands in the same zone (the C-band WDM network Cn and the L-band WDM network Ln). For this reason, setting is performed so that the wavelength λ1 is allocated to each of the WDM networks Cn and Ln in the wavelength allocation tables 9ef and 9fa.

Next, in FIG. 3, the S/C conversion units 31 convert the S-band optical signals into the C-band optical signals, and the L/C conversion units 32 convert the L-band optical signals into the C-band optical signals. Note that the S/C conversion units 31 and the L/C conversion units 32 constitute the input-side conversion unit of the claims.

The connection configuration between the respective output ends of the demultiplexers 11a to 11m (FIG. 2) and the input ends of the WXC unit 22A is as follows. That is, the output end that outputs the S-band optical signal obtained by the demultiplexer 11a demultiplexing the S-band, C-band, and L-band multiple wavelength signal light beam 1a transmitted in multiple bands from the input-side path Mi (FIG. 2) is connected to an optical amplifier 24a of the WXC unit 22A via an S/C conversion unit 31. Also, the output end of the C-band optical signal of the demultiplexer 11a is connected directly to the input end of an optical amplifier 24a of the WXC unit 22A. Further, the output end of the L-band optical signal of the demultiplexer 11a is connected to the input end of an optical amplifier 24a of the WXC unit 22A via an L/C conversion unit 32.

Meanwhile, the output end that outputs the S-band optical signal obtained by the demultiplexer 11b demultiplexing the multiple wavelength signal light beam 1b from the input-side path is connected to an optical amplifier 24b of the WXC unit 22A via an S/C conversion unit 31. Also, the output end of the C-band optical signal of the demultiplexer 11a is connected directly to the input end of an optical amplifier 24b of the WXC unit 22A. Further, the output end of the L-band optical signal of the demultiplexer 11a is connected to the input end of an optical amplifier 24b of the WXC unit 22A via an L/C conversion unit 32.

Further, the output end that outputs the S-band optical signal obtained by the demultiplexer 11m demultiplexing the multiple wavelength signal light beam 1m from the input-side path is connected to an optical amplifier 24m of the WXC unit 22A via an S/C conversion unit 31. Also, the output end of the C-band optical signal of the demultiplexer 11m is connected directly to the input end of an optical amplifier 24m of the WXC unit 22A. Further, the output end of the L-band optical signal of the demultiplexer 11m is connected to the input end of an optical amplifier 24m of the WXC unit 22A via an L/C conversion unit 32.

Next, the C/S conversion units 35 connected to optical amplifiers 27a to 27m on the output side of the WXC unit 22A convert the C-band optical signals, which have been converted from the S-band optical signals by the S/C conversion units 31 on the input side, into S-band optical signals. Also, the C/L conversion units 36 connected to optical amplifiers 27a to 27m include C/L conversion units 36 that convert the C-band optical signals, which have been converted from the L-band optical signals by the L/C conversion units 32 on the input side, into L-band optical signals. Note that the C/S conversion units 35 and the C/L conversion units 36 constitute the output-side conversion unit of the claims.

Also, in the WXC unit 22A, the output ends that output the C-band optical signals, which have been input directly from the input ends, are connected directly to the input ends of the multiplexers 12a to 12m.

<Configuration of a Wavelength Band Conversion Unit>

The circuit configurations of the S/C conversion units 31, the L/C conversion units 32, the C/S conversion units 35, and the C/L conversion units 36 described above are substantially the same. Therefore, the circuit configuration of an L/C conversion unit 32 is illustrated as a typical configuration in FIG. 4, and is now explained.

Figure 4:
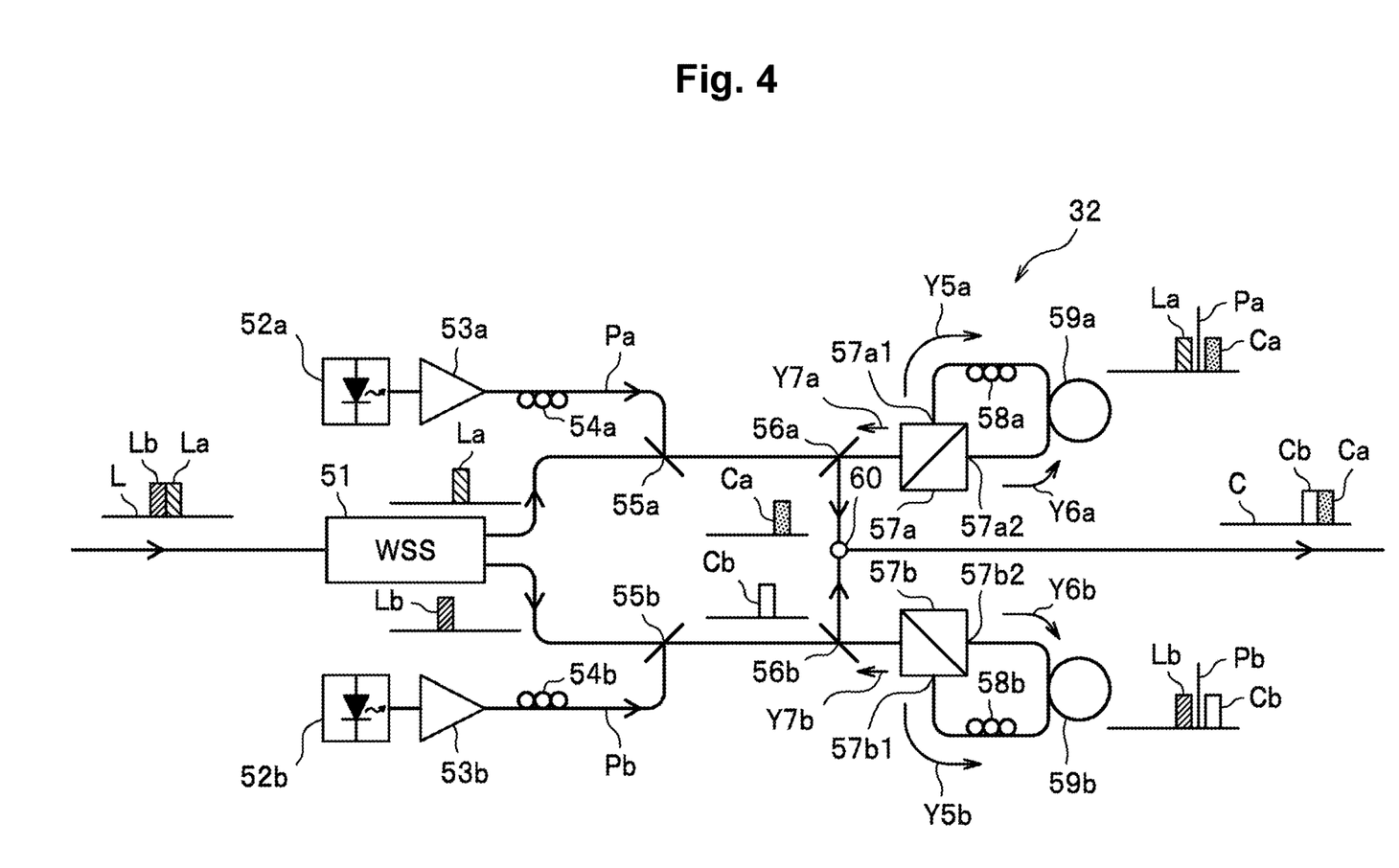
FIG. 4 is a block diagram illustrating the configuration of an L/C conversion unit according to the embodiment.

The L/C conversion unit 32 illustrated in FIG. 4 includes a WSS 51, wavelength-variable light sources 52a and 52b, amplifiers 53a and 53b, polarization controllers 54a and 54b, wavelength division multiplexing (WDM) couplers 55a, 55b, 56a, and 56b, polarization beam splitters 57a and 57b, polarization controllers 58a and 58b, loop-like high-nonlinearity fibers 59a and 59b, and an optical coupler 60.

However, in each of reference numerals 52a to 59b, "a" represents a component on the long-wavelength side of optical signals, and "b" represents a component on the short-wavelength side of optical signals.

In the polarization beam splitter 57a, two input/output ports 57a1 and 57a2 are connected in a loop-like shape by an optical fiber, and the loop-like high-nonlinearity fiber 59a is connected in the middle of the optical fiber. Further, the polarization controller 58a is connected between one input/output port 57a1 of the polarization beam splitter 57a and the high-nonlinearity fiber 59a.

Likewise, in the polarization beam splitter 57b, two input/output ports 57b1 and 57b2 are connected in a loop-like shape by an optical fiber, and the loop-like high-nonlinearity fiber 59b is connected in the middle of the optical fiber. Further, the polarization controller 58b is connected between one input/output port 57b1 of the polarization beam splitter 57b and the high-nonlinearity fiber 59b.

First, pump light that is output from the wavelength-variable light source 52a is amplified by the amplifier 53a, and the pump light Pa subjected to polarization control performed by the polarization controller 54a is input to the polarization beam splitter 57a via the WDM couplers 55a and 56a. At this stage, the pump light Pa is input to the polarization beam splitter 57a in a linearly polarized state, being inclined by 45 degrees with respect to the principal axis of the polarization beam splitter 57a. The inclination of 45 degrees is realized by the polarization control performed by the polarization controller 54a.

Likewise, pump light that is output from the wavelength-variable light source 52b is amplified by the amplifier 53b, and the pump light Pb subjected to polarization control performed by the polarization controller 54b is input to the polarization beam splitter 57b via the WDM couplers 55b and 56b. At this stage, the pump light Pb is input to the polarization beam splitter 57b in a linearly polarized state, being inclined by 45 degrees with respect to the principal axis of the polarization beam splitter 57b. The inclination of 45 degrees is realized by the polarization control performed by the polarization controller 54b.

Meanwhile, an L-band optical signal (also referred to as the optical signal L) is input from the demultiplexer 11a shown in FIG. 1 to the WSS 51 shown in FIG. 4 of the L/C conversion unit 32. The optical signal L is obtained by multiplexing an optical signal on the long-wavelength side La (also referred to as the long-wavelength-side optical signal La) and an optical signal on the short-wavelength side Lb (also referred to as the short-wavelength-side optical signal Lb).

The WSS 51 divides the optical signal L into the long-wavelength-side optical signal La and the short-wavelength-side optical signal Lb, and outputs the divided signals. The long-wavelength-side optical signal La is input to the polarization beam splitter 57a via the WDM couplers 55a and 56a. The short-wavelength-side optical signal Lb is input to the polarization beam splitter 57b via the WDM couplers 55b and 56b.

On the long-wavelength side of such a configuration, the long-wavelength-side optical signal La and the pump light Pa input to the polarization beam splitter 57a travel in a loop path in which the optical signal La and the pump light Pa are output from the first input/output port 57a1 of the polarization beam splitter 57a, and are input to the second input/output port 57a2 via the polarization controller 58a and the high-nonlinearity fiber 59a as indicated by an arrow Y5a.

In this loop path, the long-wavelength-side optical signal La and the pump light Pa output from the first input/output port 57a1 of the polarization beam splitter 57a are subjected to an optical four-wave mixing process (described later) by the high-nonlinearity fiber 59a while being subjected to polarization control by the polarization controller 58a. The high-nonlinearity fiber 59a is an optical fiber having a high nonlinearity constant as a parameter, and efficiently causes optical four-wave mixing in the loop to perform wavelength band conversion.

That is, the high-nonlinearity fiber 59a causes the two wavelength bands of the long-wavelength-side optical signal La and the pump light Pa to interact with each other as an intermodulation phenomenon caused in terms of nonlinear optics by an optical four-wave mixing process, and newly generates an optical signal Ca on the long-wavelength side in C-band, which is one wavelength band. The generated optical signal Ca, the long-wavelength-side optical signal La, and the pump light Pa are input to the second input/output port 57a2 of the polarization beam splitter 57a.

At the same time as this operation, the long-wavelength-side optical signal La and the pump light Pa that have been input to the polarization beam splitter 57a travel in a loop path in which the optical signal La and the pump light Pa are output from the second input/output port 57a2, and are input to the first input/output port 57a1 via the high-nonlinearity fiber 59a and the polarization controller 58a as indicated by an arrow Y6a in the opposite direction to the arrow Y5a. Also in this loop path, an optical signal on the long-wavelength side Ca in C-band (also referred to as the long-wavelength-side optical signal Ca) is newly generated through an optical four-wave mixing process in the same manner as above.

The two long-wavelength-side optical signals Ca generated by bidirectionally traveling in the above loop path are subjected to wavelength multiplexing by the polarization beam splitter 57a. As indicated by an arrow Y7a, the long-wavelength-side optical signals Ca are output toward the input side, extracted by the WDM coupler 56a, and output to the optical coupler 60.

Also on the short-wavelength side, the same wavelength band conversion process as that on the long-wavelength side is performed.

That is, the long-wavelength-side optical signal Lb and the pump light Pb input to the polarization beam splitter 57b travel in a loop path in which the optical signal Lb and the pump light Pb are output from the first input/output port 57b1 of the polarization beam splitter 57b, and are input to the second input/output port 57b2 via the polarization controller 58b and the high-nonlinearity fiber 59b as indicated by an arrow Y5b.

In this loop path, the long-wavelength-side optical signal Lb and the pump light Pb output from the first input/output port 57b1 are subjected to an optical four-wave mixing process by the high-nonlinearity fiber 59b while being subjected to polarization control by the polarization controller 58b. Through this process, an optical signal Cb on the short-wavelength side in C-band is newly generated, and is input to the second input/output port 57b2 of the polarization beam splitter 57b, together with the long-wavelength-side optical signal Lb and the pump light Pb.

At the same time as this operation, the long-wavelength-side optical signal Lb and the pump light Pb travel in a loop path from the second input/output port 57b2 of the polarization beam splitter 57b, as indicated by an arrow Y6b in the opposite direction to the arrow Y5b. Also in this loop path, an optical signal on the short-wavelength side Cb in C-band (also referred to as the short-wavelength-side optical signal Cb) is newly generated through an optical four-wave mixing process in the same manner as above.

The two short-wavelength-side optical signals Cb generated by bidirectionally traveling in the above loop path are subjected to wavelength multiplexing by the polarization beam splitter 57b, are output to the input side as indicated by an arrow Y7b, and are output to the optical coupler 60 via the WDM coupler 56b.

The optical coupler 60 combines the long-wavelength-side optical signals Ca and the short-wavelength-side optical signals Cb into a C-band optical signal. In this manner, the L/C conversion unit 32 converts an L-band optical signal supplied from the demultiplexer 11a into a C-band optical signal. The converted C-band optical signal is input to an optical amplifier 24a of the WXC unit 22A.

<Operation According to the Embodiment>

Next, an operation of the multiband transmission system 10A illustrated in FIG. 1 is described with reference to a flowchart shown in FIG. 5.

Figure 5:
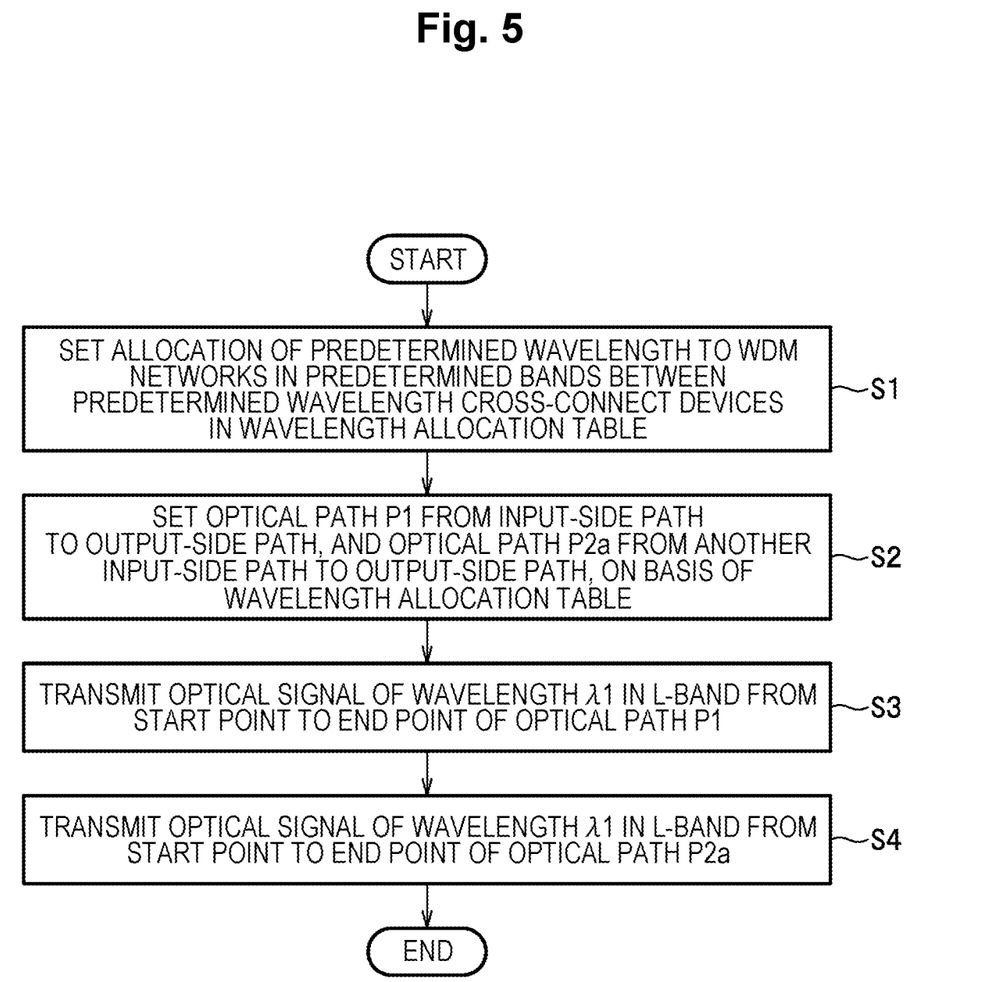
FIG. 5 is a flowchart for explaining an operation of the multiband transmission system according to the embodiment.

In step S1 shown in FIG. 5, the link wavelength allocation control unit 29 performs setting to allocate the wavelength $\lambda 1$ to the L-band WDM network Ln and the C-band WDM network Cn between the wavelength cross-connect devices 20eA and 20fA in the wavelength allocation table 9ef, as illustrated in FIG. 1. Further, the link wavelength allocation control unit 29 performs setting to allocate the wavelength $\lambda 1$ to the L-band WDM network Ln between the wavelength cross-connect devices 20fA and 20aA in the wavelength allocation table 9fa.

Next, in step S2, on the basis of the wavelength allocation table 9*ef*, the link wavelength allocation control unit 29 sets the optical path P1 (solid line) in the L-band WDM network Ln from the path Mi1 on the input side to the path Mo1 on the output side via the wavelength cross-connect devices 20*d*, 20*e*, and 20*f*.

At the same time as this, on the basis of the wavelength allocation tables 9*ef* and 9*fa*, the link wavelength allocation control unit 29 sets the optical path P2*a* (dashed line) through which the same optical signal λ1L as above can be transmitted from the path Mi2 on the input side toward the path Mo2 on the output side via the wavelength cross-connect devices 20*e*A, 20*f*A, and 20*a*A, in the C-band WDM network Cn between the wavelength cross-connect devices 20*e*A and 20*f*A, and in the L-band WDM network Ln between the wavelength cross-connect devices 20*f*A and 20*f*A.

That is, as the different optical paths P1 and P2*a* through which optical signals λ1L of the same wavelength λ1 are transmitted are set in the same zone (between the wavelength cross-connect devices 20*e*A and 20*f*A, for example), the respective optical paths P1 and P2*a* are set in WDM networks of different bands in the same zone (the C-band WDM network Cn and the L-band WDM network Ln).

Next, in step S3, the optical signal λ1L of the wavelength λ1 in L-band is transmitted from the path Mi1 on the input side to the optical path P1 as described below.

First, the L-band optical signal λ1L input from the path Mi1 on the input side to the wavelength cross-connect device 20*d*A is converted into a C-band optical signal by an L/C conversion unit 32 via the demultiplexer 11*a* illustrated in FIG. 2, for example. The converted C-band optical signal λ1L is input to the WSS 25*a*3 via an optical amplifier 24*a* of the WXC unit 22A illustrated in FIG. 3, and is output from the output end to the WSS 26*b*3 in the L-band line, for example.

Further, the C-band optical signal λ1L is converted to an L-band optical signal by a C/L conversion unit 36 via the WSS 26*b*3 and an optical amplifier 27*b*, and is input to the wavelength cross-connect device 20*e*A in the subsequent stage via the optical path P1 in the L-band WDM network Ln illustrated in FIG. 1. This wavelength cross-connect device 20*e*A also performs the same processing as the wavelength cross-connect device 20*d*A in the preceding stage, and the wavelength cross-connect device 20*f*A in the subsequent stage also performs the same processing. In the wavelength cross-connect device 20*f*A, the optical signal λ1L of the wavelength λ1 in L-band is output from the multiplexer 12*b* illustrated in FIG. 2 to the path Mo1 (FIG. 1) on the output side, for example.

Next, in step S4, the optical signal λ1L of the wavelength λ1 in L-band as above is transmitted from the path Mi2 illustrated in FIG. 1 to the optical path P2*a* as described below.

First, the L-band optical signal λ1L input from the path Mi2 on the input side to the wavelength cross-connect device 20*e*A is converted into a C-band optical signal by an L/C conversion unit 32 via the demultiplexer 11*a* illustrated in FIG. 2, for example. The converted C-band optical signal λ1L is input to the WSS 25*a*3 via an optical amplifier 24*a* illustrated in FIG. 3, and is output from the output end to the WSS 26*b*2 in the C-band line, for example.

Further, the C-band optical signal λ1L is input, via the WSS 26*b*2 and an optical amplifier 27*b*, to the wavelength cross-connect device 20*f*A in the subsequent stage through the optical path P2*a* in the C-band WDM network Cn illustrated in FIG. 1. The C-band optical signal λ1L input to the wavelength cross-connect device 20*f*A is input to the WSS 25*b*2 via an optical amplifier 24*b* illustrated in FIG. 3, and is output from the output end to the WSS 26*b*3 in the L-band line, for example. This C-band optical signal λ1L is converted to an L-band optical signal by a C/L conversion unit 36 via the WSS 26*b*3 and an optical amplifier 27*b*, and is further input to the wavelength cross-connect device 20*a*A in the subsequent stage via the optical path P2*a* in the L-band WDM network Ln illustrated in FIG. 1.

In this wavelength cross-connect device 20*a*A, the L-band optical signal λ1L is converted into a C-band optical signal by an L/C conversion unit 32 via the demultiplexer 11*a* illustrated in FIG. 2, for example. This C-band optical signal λ1L is input to the WSS 25*a*3 via an optical amplifier 24*a* illustrated in FIG. 3, and is output from the output end to the WSS 26*b*3 in the L-band line, for example. Further, the C-band optical signal λ1L is converted into an L-band optical signal by a C/L conversion unit 36 via the WSS 26*b*3 and an optical amplifier 27*b*, and is output from the multiplexer 12*b* illustrated in FIG. 2 to the path Mo2 (FIG. 1) on the output side.

<Effects of the Embodiment>

The wavelength cross-connect device 20A (the wavelength cross-connect devices 20*a*A to 20*f*A) of the multiband transmission system 10A according to this embodiment performs a relay process of amplifying, with the optical amplifiers 24*a* to 24*m* and 27*a* to 27*m*, optical signals in the respective wavelength bands for each path Mi, switching path with the WSSs 25*a*1 to 25*m*3 and 26*a*1 to 26*m*3, and outputting the optical signals to the paths Mo on the output side, the optical signals in the respective wavelength bands having been obtained by demultiplexing multiple wavelength signal light into different wavelength bands, the multiple wavelength signal light having been obtained by multiplexing respective optical signals in different wavelength bands that have been transmitted in multiple bands through an optical transmission line formed with one or a plurality of optical fibers.

The WSSs 25*a*1 to 25*m*3 and 26*a*1 to 26*m*3 perform optical signal processing to branch and output a plurality of inputs from one input end through one output end on the input side, and then output a plurality of combined inputs from one input end through one output end on the output side.

The wavelength cross-connect device 20A includes the optical amplifiers 24*a* to 24*m* and 27*a* to 27*m*, and the WSSs 25*a*1 to 25*m*3 and 26*a*1 to 26*m*3, and also includes the WXC unit 22A that performs a process of relaying optical signals in a predetermined specific wavelength band (C-band) among the different wavelength bands (the wavelength bands of S-band, C-band, and L-band). Also, input-side conversion units (the S/C conversion units 31 and the L/C conversion units 32) that convert optical signals in the wavelength bands other than the specific wavelength band into optical signals in the specific wavelength band are provided on the input side of the WXC unit 22A. Further, output-side conversion units (the C/S conversion units 35 and the C/L conversion units 36) that convert optical signals in the specific wavelength band converted by the input-side conversion units into the optical signals prior to the conversion are provided on the output side of the WXC unit 22A. The optical signals in the specific wavelength band that have been input directly from the input side are then directly output after the relay process at the WXC unit 22A.

With this configuration, after optical signals in the different wavelength bands are converted into optical signals in the same wavelength band (specific wavelength band), optical signal processing can be performed in the specific wavelength band by the single WXC unit 22A. Thus, the device size and the power consumption of the WXC unit 22A can be reduced.

(2) The multiband transmission system 10A includes a plurality of the wavelength cross-connect devices 20A described in the above (1), and is formed by connecting the plurality of the wavelength cross-connect devices 20aA to 20fA in a ring-like form with the WDM networks Sn to Ln for each band of a plurality of bands on the input/output sides of the wavelength cross-connect devices 20aA to 20fA.

The link wavelength allocation control unit 29 is provided, and this link wavelength allocation control unit 29 performs control to allocate the predetermined wavelength λ1 to the WDM networks Cn and Ln in the respective bands of the plurality of bands (C-band and L-band) between wavelength cross-connect devices (the wavelength cross-connect devices 20eA and 20fA, for example) connected in a ring-like form, and to set the optical paths P1 and P2a through which optical signals of the allocated wavelength λ1 are transmitted between an input-side path and an output-side path via one or a plurality of the wavelength cross-connect devices 20eA to 20aA.

The link wavelength allocation control unit 29 is designed to perform control to set the different optical paths P1 and P2a through which optical signals of the same wavelength λ1 are transmitted in the same zone between the wavelength cross-connect devices 20eA and 20fA, in the WDM networks Cn and Ln of different bands (C-band and L-band) in the same zone.

With this configuration, the different optical paths P1 and P2a through which optical signals of the same wavelength λ1 are transmitted are set in the same zone between the wavelength cross-connect devices 20eA and 20fA, in the WDM networks Cn and Ln of different bands (C-band and L-band) in the same zone. Thus, even if optical signals of the same wavelength λ1 are transmitted in the different optical paths P1 and P2a in the same zone, any wavelength collision will not occur.

<Effects>

(1) A wavelength cross-connect device performs a relay process of amplifying, with an optical amplifier, optical signals in respective wavelength bands formed by demultiplexing multiple wavelength signal light into different wavelength bands for each path, changing paths with a WSS, and outputting the optical signals to a path on the output side, the multiple wavelength signal light being formed by multiplexing respective optical signals in different wavelength bands transmitted in multiple bands through an optical transmission line formed with one or a plurality of optical fibers, the WSS performing optical signal processing of outputting a plurality of combined inputs from one input end through one output end on the outside side after branching and outputting inputs from one input end through one output end on the input side. The wavelength cross-connect device includes: a wavelength cross-connect (WXC) unit that includes the optical amplifier and the WSS, and performs the relay process on an optical signal in a predetermined specific wavelength band among the different wavelength bands; an input-side conversion unit that is disposed on the input side of the WXC unit, and converts an optical signal in a wavelength band other than the specific wavelength band into an optical signal in the specific wavelength band; and an output-side conversion unit that is disposed on the output side of the WXC unit, and converts the optical signal in the specific wavelength band converted by the input-side conversion unit into the optical signal prior to conversion. The optical signal in the specific wavelength band that has been input directly from the input side is directly output after the relay process at the WXC unit.

With this configuration, after optical signals in the different wavelength bands are converted into optical signals in the same wavelength band (specific wavelength band), optical signal processing can be performed in the specific wavelength band by the single WXC unit. Thus, the device size and the power consumption of the WXC unit can be reduced.

(2) A multiband transmission system includes a plurality of the wavelength cross-connect devices described in the above (1), and is formed by connecting the plurality of the wavelength cross-connect devices in a ring-like form with wavelength division multiplex (WDM) networks in the respective bands on the input and output sides of the wavelength cross-connect devices. The multiband transmission system includes a link wavelength allocation control unit that performs control to allocate a predetermined wavelength to a WDM network in each of the bands between the wavelength cross-connect devices connected in the ring-like form, and set an optical path through which an optical signal of the allocated wavelength is transmitted between an input-side path and an output-side path via one or a plurality of the wavelength cross-connect devices. The link wavelength allocation control unit performs control to set different optical paths through which optical signals of the same wavelength are transmitted in the same zone between wavelength cross-connect devices, in WDM networks in different bands in the same zone.

With this configuration, the different optical paths through which optical signals of the same wavelength are transmitted are set in the same zone between wavelength cross-connect devices, in the WDM networks of different bands in the same zone. Thus, even if optical signals of the same wavelength are transmitted in the different optical paths in the same zone, any wavelength collision will not occur.

In addition to the above, the specific configuration can be modified as appropriate, without departing from the scope of the present invention.

REFERENCE SIGNS LIST 1a to 1m multiple wavelength signal light beam
9ef, 9fa wavelength allocation table
10A multiband transmission system
11a to 11m wavelength band demultiplexer
12a to 12m wavelength band multiplexer
20A wavelength cross-connect device
22A WXC unit
24b to 24m, 27a to 27m optical amplifier
25a1 to 25m3, 26a1 to 26m3 WSS
29 link wavelength allocation control unit
31 S/C conversion unit (input-side conversion unit)
32 L/C conversion unit (input-side conversion unit)
35 C/S conversion unit (output-side conversion unit)
36 C/L conversion unit (output-side conversion unit)
Sn S-band WDM network
Cn C-band WDM network
Ln L-band WDM network
Mi input-side path
Mo output-side path
P1, P2a optical path
λ1L optical signal

The invention claimed is:
1. A multiband transmission system that includes a plurality of wavelength cross-connect devices, each of the plurality of the wavelength cross-connect devices being configured to perform a relay process of amplifying, with an optical amplifier, optical signals in respective wavelength bands provided by demultiplexing multiple wavelength signal light into different wavelength bands for each path, changing paths with a wavelength selective switch (WSS), and outputting the optical signals to an output side path to respective output-side paths, the multiple wavelength signal light being provided by multiplexing respective optical signals in different wavelength bands and transmitted in multiple bands through an optical transmission line including at least one optical fiber, the WSS performing optical signal processing of outputting a combined output of a plurality of inputs from one input end through one output end on an outside side after branching and outputting inputs from one input end through one output end on an input side, the wavelength cross-connect device including:
- a wavelength cross-connect (WXC) unit that includes the optical amplifier and the WSS and that is configured to perform the relay process on an optical signal in a predetermined specific wavelength band among the different wavelength bands;
- an input-side conversion unit, including circuitry, that is disposed at an input side of the WXC unit and that is configured to convert a first optical signal in a wavelength band other than the specific wavelength band into a second optical signal in the specific wavelength band; and
- an output-side conversion unit, including circuitry, that is disposed at an output side of the WXC unit and that is configured to convert the second optical signal into the first optical signal,
- wherein an optical signal in the specific wavelength band that has been input directly from the input side is directly output after the relay process at the WXC unit,
- the multiband transmission system being formed by the plurality of the wavelength cross-connect devices,
- the plurality of the wavelength cross-connect devices being connected in a ring-like form with wavelength division multiplex (WDM) networks in respective bands of a plurality of bands on input and output sides of the wavelength cross-connect devices, the multiband transmission system comprising:
- a link wavelength allocation control unit, comprising circuitry, that is configured to:
  - allocate a predetermined wavelength to a WDM network in each of the bands between the wavelength cross-connect devices connected in the ring-like form, and
  - set an optical path through which an optical signal of the allocated wavelength is transmitted between an input-side path and an output-side path via at least one of the wavelength cross-connect devices,
- wherein the link wavelength allocation control unit is configured to set different optical paths through which optical signals of the same wavelength are transmitted in a same zone between wavelength cross-connect devices, in WDM networks in different bands in the same zone.

2. The wavelength cross-connect device included in the multiband transmission system according to claim 1, and configured to perform a relay process of demultiplexing multiple wavelength signal light being provided by multiplexing respective optical signals in different wavelength bands and transmitted in multiple bands, changing respective paths of the optical signals, and outputting the optical signals to respective output-side paths, the wavelength cross-connect device comprising:
- a wavelength cross-connect (WXC) unit that performs the relay process on an optical signal in a predetermined specific wavelength band among the different wavelength bands;
- an input-side conversion unit, comprising circuitry, that is disposed at an input side of the WXC unit and that is configured to convert a first optical signal in a wavelength band other than the specific wavelength band into a second optical signal in the specific wavelength band.

3. The wavelength cross-connect device according to claim 2, the wavelength cross-connect device configured to perform a relay process of amplifying, with an optical amplifier, optical signals in respective wavelength bands provided by demultiplexing multiple wavelength signal light into different wavelength bands for each path, changing paths with a wavelength selective switch (WSS), and outputting the optical signals to respective output-side paths, the multiple wavelength signal light being provided by multiplexing respective optical signals in different wavelength bands and transmitted in multiple bands through an optical transmission line including at least one optical fiber, the WSS performing optical signal processing of outputting a combined output of a plurality of inputs from one input end through one output end on an outside side after branching and outputting inputs from one input end through one output end on an input side.

4. The wavelength cross-connect device included in the multiband transmission system according to claim 1, and configured to perform a relay process of demultiplexing multiple wavelength signal light being provided by multiplexing respective optical signals in different wavelength bands and transmitted in multiple bands, changing respective paths of the optical signals, and outputting the optical signals to respective output-side paths, the wavelength cross-connect device comprising:
- a wavelength cross-connect (WXC) unit that performs the relay process on an optical signal in a predetermined specific wavelength band among the different wavelength bands;
- an output-side conversion unit, comprising circuitry, that is disposed at an output side of the WXC unit and that is configured to convert a first optical signal in the specific wavelength band into a second optical signal in a wavelength band other than the specific wavelength band.

5. The wavelength cross-connect device according to claim 4, the wavelength cross-connect device configured to perform a relay process of amplifying, with an optical amplifier, optical signals in respective wavelength bands provided by demultiplexing multiple wavelength signal light into different wavelength bands for each path, changing paths with a wavelength selective switch (WSS), and outputting the optical signals to respective output-side paths, the multiple wavelength signal light being provided by multiplexing respective optical signals in different wavelength bands and transmitted in multiple bands through an optical transmission line including at least one optical fiber, the WSS performing optical signal processing of outputting a combined output of a plurality of inputs from one input end through one output end on an outside side after branching and outputting inputs from one input end through one output end on an input side.

6. The wavelength cross-connect device included in the multiband transmission system according to claim 1, and configured to perform a relay process of demultiplexing multiple wavelength signal light being provided by multiplexing respective optical signals in different wavelength bands and transmitted in multiple bands, changing respective paths of the optical signals, and outputting the optical signals to respective output-side paths, the wavelength cross-connect device comprising:
- a wavelength cross-connect (WXC) unit that performs the relay process on an optical signal in a predetermined specific wavelength band among the different wavelength bands;
- an input-side conversion unit, comprising circuitry, that is disposed at an input side of the WXC unit and that is configured to convert a first optical signal in a wavelength band other than the specific wavelength band into a second optical signal in the specific wavelength band; and
- an output-side conversion unit, comprising circuitry, that is disposed at an output side of the WXC unit and that is configured to convert the second optical signal into an optical signal in a wavelength band other than the specific wavelength band.

7. The wavelength cross-connect device according to claim 6, the wavelength cross-connect device configured to perform a relay process of amplifying, with an optical amplifier, optical signals in respective wavelength bands provided by demultiplexing multiple wavelength signal light into different wavelength bands for each path, changing paths with a wavelength selective switch (WSS), and outputting the optical signals to respective output-side paths, the multiple wavelength signal light being provided by multiplexing respective optical signals in different wavelength bands and transmitted in multiple bands through an optical transmission line including at least one optical fiber, the WSS performing optical signal processing of outputting a combined output of a plurality of inputs from one input end through one output end on an outside side after branching and outputting inputs from one input end through one output end on an input side.

8. A multiband transmission method implemented in a multiband transmission system that includes a plurality of wavelength cross-connect devices, the plurality of the wavelength cross-connect devices being connected in a ring-like form with WDM networks in respective bands of a plurality of bands on input and output sides of the wavelength cross-connect devices, wherein:
the wavelength cross-connect device is configured to perform a relay process of amplifying, with an optical amplifier, optical signals in respective wavelength bands provided by demultiplexing multiple wavelength signal light into different wavelength bands for each path, changing paths with a wavelength selective switch (WSS), and outputting the optical signals to an output side path to respective output-side paths, the multiple wavelength signal light being provided by multiplexing respective optical signals in different wavelength bands and transmitted in multiple bands through an optical transmission line including at least one optical fiber, the WSS performing optical signal processing of outputting a combined output of a plurality of inputs from one input end through one output end on an outside side after branching and outputting inputs from one input end through one output end on an input side;
the wavelength cross-connect device includes:
- a wavelength cross-connect (WXC) unit that includes the optical amplifier and the WSS and that is configured to perform the relay process on an optical signal in a predetermined specific wavelength band among the different wavelength bands;
- an input-side conversion unit, including circuitry, that is disposed at an input side of the WXC unit and that is configured to convert a first optical signal in a wavelength band other than the specific wavelength band into a second optical signal in the specific wavelength band; and
- an output-side conversion unit, including circuitry, that is disposed at an output side of the WXC unit and that is configured to convert the second optical signal into the first optical signal; and
- an optical signal in the specific wavelength band that has been input directly from the input side is directly output after the relay process at the WXC unit;

the method comprising:
- allocating a predetermined wavelength to a WDM network in each of the bands between the wavelength cross-connect devices connected in the ring-like form;
- setting an optical path through which an optical signal of the allocated wavelength is transmitted between an input-side path and an output-side path via at least one of the wavelength cross-connect devices; and
- setting different optical paths through which optical signals of a same wavelength are transmitted in a same zone between the wavelength cross-connect devices, in WDM networks in different bands in the same zone.

* * * * *